United States Patent [19]

Zarouni

[11] 4,124,774
[45] Nov. 7, 1978

[54] TELEPHONE STATION COIN MEMORY AND CONTROL SYSTEM

[75] Inventor: Alfred Zarouni, Middletown, N.J.

[73] Assignee: Bell Telephone Laboratories, Incorporated, Murray Hill, N.J.

[21] Appl. No.: 819,244

[22] Filed: Jul. 27, 1977

[51] Int. Cl.² .......................................... H04M 17/00
[52] U.S. Cl. .................................. 179/6.3 R; 179/6.5
[58] Field of Search ................... 179/6.3 R, 6.31, 6.4, 179/6.5; 235/92 CN, 92 TE, 91 E

[56] References Cited

U.S. PATENT DOCUMENTS

| | | | |
|---|---|---|---|
| 3,814,907 | 6/1974 | Edington et al. | 179/6.3 R |
| 3,825,729 | 7/1974 | Menke | 235/92 CN |
| 3,952,160 | 4/1976 | Pasternack et al. | 179/6.31 |
| 4,028,494 | 6/1977 | Zarouni | 179/6.3 R |
| 4,039,768 | 8/1977 | O'Maley | 179/6.3 R |
| 4,041,243 | 8/1977 | Zarouni | 179/6.3 R |
| 4,041,280 | 8/1977 | Ohsako et al. | 235/92 CN |

Primary Examiner—Kathleen H. Claffy
Assistant Examiner—Gerald L. Brigance
Attorney, Agent, or Firm—Frederick W. Padden

[57] ABSTRACT

Automatic coin telephone station and central office facilities are disclosed for deriving data on the exact numbers and types of coins deposited during initial and overtime periods. Each station is equipped with nickel, dime and quarter binary counter memories and with flip-flop and logic gating control circuitry which is responsive to interrogate, coin collect and return signals received from the central office for sequentially interrogating the memories and frequency shift keying the stored information to the central office. A coin processor and memory, preference and connector, interrogate tone generator, and detectors are integrated into the central office switching system. The latter facilities are activated by a coin supervisory circuit during initial and overtime periods to identify the calling station, to interrogate its coin memories for initial and overtime deposits, and then to store the actual coin denominations for subsequent retrieval and correlation in connection with coin box fill determinations and collection scheduling. A Traffic Service Position System with automatic coin telephone service arrangements is furnished with match circuitry for checking actual coin deposits and guarding against coin call fraud with "red-box" devices.

31 Claims, 2 Drawing Figures

TELEPHONE STATION COIN MEMORY AND CONTROL SYSTEM

BACKGROUND OF THE INVENTION

This invention relates to coin telephone station apparatus and centralized common control equipment for automatically determining without operator assistance the actual number and types of coins deposited during initial and overtime periods of local and toll calls. The invention particularly relates to automatic facilities and call processing techniques which prevent customers from unwarrantedly obtaining free telephone service by simulating coin deposits.

Telephone company improvement programs in the last decade have resulted in a multitude of coin service innovations which better serve customer needs and reduce operating costs. Illustratively, the programs have modified coin service from prepay to dial-tone-first operation and have provided free coin service for special numbers, such as the "911" emergency code. In addition, single slot paystations have been introduced for flexibility in deposits, improved transmission, and reductions in vandalism and theft. Such a single slot phone uses a solid state totalizer circuit which counts the coin deposits and outpulses respective tone pulses for each type of coin for facilitating more automatic coin call processing. Significantly, the introduction of TSPS (Trafffic Service Position System) and its integrated ACTS (Automatic Coin Telephone System) substantially aid the more efficient and less costly serving of coin calls with significantly reduced operator assistance.

Despite the improvements achieved through the foregoing programs and the widespread use of TSPS, telephone companies heretofore have not adequately solved the problems of fraud on coin calls and the inefficient and costly procedures for scheduling and collecting paystation coin boxes. Occasionally, the companies are subjected to fraud due to customer simulations of coin deposits by false ground start signaling and by counterfeit tones from so-called "red-box" devices. The scheduling procedure has proven deficient because the telcos have inadequate information as to the coin box fill. High cost and inefficiency arise in collection arrangements because telcos utilize many precautionary measures to safeguard against theft following the removal of the coin box from the paystation by telco employees. The precautions are taken because the companies have insufficient accumulated data concerning the total amount of money in a collected box.

In view of the foregoing, it is apparent that a need exists for facilities and procedures which prevent coin call fraud and provide adequate data on coin deposits for enabling telcos efficiently to schedule and collect coin boxes at reasonable cost and without the necessity for burdensome integrity check precautions in the collection operations.

It is an object of my invention to reduce the need for operator assistance on coin calls and particularly to provide automatic facilities for deriving precise data on the numbers and types of coins deposited in paystations during each call and accumulating coin box fill data over a multiplicity of calls in order to improve coin box collection scheduling and guarding against coin theft.

Another object is to improve coin box collection procedures and specifically to reduce the necessity for special checking activities heretofore used for guarding against coin theft during such collections.

It is an object of my invention to provide improvements for preventing fraudulent calls from coin stations and particularly for detecting calling party attempts to obtain free telephone service by simulating coin deposit signals.

A specific object is to furnish facilities for detecting and preventing fraud calls that use "red-box" devices to simulate coin deposit tones particularly on toll calls.

SUMMARY OF THE INVENTION

The foregoing problems and deficiencies are solved and objects are achieved in accordance with a specific exemplary embodiment of my invention in which automatic coin station and central office facilities are advantageously provided for deriving data on the exact number and type of coins deposited during initial and overtime periods of a call and without the assistance of an operator. Each station is illustratively equipped with nickel, dime and quarter memories and with control circuitry which is responsive to signals received from the central office for sequentially interrogating the memories and sending the stored information to the central office during memory readout, coin collect and overtime deposit check operations. The central office facilities include a processor, coin memory, preference and connector, tone generator and detector which are activated by a coin supervisory circuit during initial and overtime periods to identify the calling station, to interrogate the memories at the calling station for the initial and overtime deposits needed for the continuation or termination of the call, and then to store the actual coin denominations for subsequent retrieval and correlation in connection with coin box collection scheduling.

An advantage of my illustrative emodiment is that it enables a telco to accumulate precise coin data for each coin station at a centralized coin control location and to utilize it to determine when coin boxes are adequately filled and require collection. In this way, the telco need only spend personnel time for required coin box collections.

Another advantage is that the telco does not have to resort to checking its employee integrity during coin box collection because it it furnished with accurate data on the total amount of money and the precise number of nickels, dimes and quarters in each coin box. Heretofore, telcos have resorted to integrity checking practices such as predepositing a marked number of different coins in selected coin boxes and then ascertaining the presence of such coins during coin counting operations. If any marked coin is found to be missing, the telco determines that it has an integrity problem. The substantial amount of personnel time and expense involved in such practices are essentially eliminated by use of my invention.

In accordance with my invention, the central office circuitry is operative on each call to signal the memory control circuit of the calling station to interrogate each of the station memories for reading out data on the precise number of deposited nickels, dimes and quarters. My invention provides for the FSK (Frequency Shift Key) signaling of the readout data to the central office circuits. the calling party advantageously has no facilities for simulating my interrogation and FSK signaling arrangements and, significantly, my invention makes fraud call attempts with ground start signaling and tones from "red-box" devices ineffective and causes the attempted call to be terminated in the absence of required coins.

It is a feature of my invention that each nickel, dime and quarter memory circuit comprises a binary counter which is illustratively activated by the conventional coin slot mechanism to register the number of respective coins deposited on a call. Each such binary counter has a plurality of stages with "0" and "1" outputs. A gating arrangement is selectively enabled by the station memory control circuit to convey signals from the binary counter "0" and "1" outputs to an FSK transmitter for sending the registered data in coded form to the central office facilities.

Another feature is that the station memory control circuit comprises a plural stage ring counter which is stepped from stage-to-stage by interrogate and coin collect logic circuitry in response to respective interrogate, coin collect and return signals received from the central office. Initially, the ring counter rests in a reset stage and is stepped from stage-to-stage to control the sequential activation of the aforementioned gating arrangement for interrogating the nickel, dime and quarter binary counters and FSK transmitting the registered coin data to the central office. The memory control circuit includes a pulse generator and gate logic for controlling the stepping of the ring counter under control of interrogate and coin collect circuits. Each of the latter circuits illustratively comprises a flip-flop which is set in response to a control signal received over the station line from the central office for initiating the ring counter stepping. The control signal in the case of the coin collect job is a conventional +130 volt signal. For the interrogate function, a special in-band tone signal is used as the control signal. The latter is sensed by an interrogate tone detector which, in turn, sets the interrogate flip-flop to initiate the ring counter stepping from stage-to-stage.

It is another feature of my invention that a memory reset circuit is activated by the coin collect flip-flop and by the reset stage of the ring counter for causing a resetting of the station nickel, dime and quarter memories on coin collect operations following a read-out of registered data from those memories. To do so, the illustrative memory control circuit comprises a delay circuit which is activated by an output of the coin collect flip-flop for partially enabling a reset gate shortly after the ring counter is stepped from its reset stage. The reset gate is subsequently fully enabled when the ring counter is again stepped to its reset stage. When full enablement occurs, the registered data in the station memories is erased. Another delay circuit connects a reset signal from the reset stage of the ring counter to a reset input of the coin collect flip-flop for effecting its resetting and, in turn, a termination of further counter stepping and of the coin collect operation. Actual collection of coins in response to the coin collect signal on the station line is accomplished in the conventional manner.

According to another feature of my invention, the interrogate circuitry at the coin station is operative in response to the interrogate tone from the central office for reading the coin memories without any erasure of their contents as on a coin collect operation. This procedure is effective for checking the adequacy of coin deposits at any time during call processing. To perform the interrogate job, the interrogate flip-flop is activated to effect a read out of the registered memory data and to FSK it over the station line to the central office under control of the ring counter as priorly described. When the ring counter is again stepped to its reset stage, an output pulse is applied to a reset input of the interrogate flip-flop for resetting it and terminating further memory read out without any erasure of the coin memories.

Another feature of my invention is the provision of a station coin return circuit for resetting the coin memories illustratively in response to the conventional −130 volt signal applied to the station line by the central office for effecting a coin return to the caller. The coin return circuit includes a flip-flop which is set in response to the −130 volt signal for applying a common reset to all of the binary counters to effect an erasure of registered coin data. The same −130 volt signal is processed through a delay circuit and effects a resetting of the coin return flip-flop after the binary counters have been reset.

It is another feature of my invention that the central office switching system is equipped with a coin processor for controlling coin signaling jobs and centralized coin data storage for a plurality of coin stations on both local and toll calls. The processor includes a process control means for overall control of the coin call work functions and a memory for the storage of coin station data. Coin collect and return signals as well as the interrogate tone are applied over call connections to a calling line at times specified by the process control circuit. The latter also derives an identification of the calling line for storage in the processor memory together with coin data read out of the calling station coin memories. Such data is obtained from the call connections by an FSK signal detector and translator circuit which receives the FSK signals from the calling line and translates them into data signals suitable for storage in the processor memory in association with the derived calling station identity. Illustratively, the services of the processor are obtained during strategic portions of initial and overtime periods of a local and a toll call to perform the foregoing functions in addition to determinations of the adequacy of coin deposits and the necessity of call processing to announcement facilities and operator consoles incident to the continuation and termination of each call.

The processor is advantageously arranged to provide each station with variable charge rates for initial and overtime periods.

On local calls, the services of the processor are obtained by a coin supervisory circuit bidding through a preference and connector circuit under control of a local coin trunk circuit. The processor is accessed on a toll call by a toll coin trunk circuit cooperating with a TSPS system equipped with ACTS facilities.

A salient feature of my invention is the provision of "red-box" fraud call detection circuitry in the TSPS system. The circuitry prevents caller simulated coin deposit signals from allowing that person to obtain free telephone service. It does so by a matching arrangement which effectively compares the coin deposit signals which may or may not be simulated with data derived from the station coin memories. If a match is recognized, an appropriate deposit is determined to have been made and the call is permitted to continue, On the other hand, a failure to match indicates a trouble or a "red-box" condition and the call is terminated. Specifically, the fraud detection circuitry includes a match circuit which compares station coin memory data with the station coin tones received during the interval in which coin deposits should be made to determine the existence of a match. "Red-box" devices are usually employed to simulate the totalizer data which is transmitted to the TSPS by means of DF (Dual Frequency) signaling. DF signals are detected at the TSPS by a DF detector and translator circuit which responsively furnishes output data signals for use in the matching. Station coin memory data, as priorly explained, is transmitted by FSK signaling. FSK signals are detected at the TSPS by an FSK detector and translator circuit which also furnishes output data signals for use in the matching.

DRAWING DESCRIPTION

The foregoing and other objects, features and advantages of this invention will be more fully understood from a reading of the following detailed description of an exemplary embodiment thereof shown in the drawing in which:

FIG. 1 shows, in block schematic form, the interrelation of the coin station set memory and control circuitry; and FIG. 2 depicts a central switching system and a TSPS equipped with ACTS facilities and coin call control and processing apparatus.

The circuitry of FIG. 1 may advantageously be terminated for coin telephone call processing in a local automatic central switching system of FIG. 2 wherein common control circuits are employed to control the establishment of local and toll calls through a switching network. One such system is well known in the art as No. 5 Crossbar, an early version of which is disclosed in A. J. Busch U.S. Pat. No. 2,585,904, issued Feb. 19, 1952. Toll calls from the coin telephone station of FIG. 1 are extended through the local central switching system to the TSPS equipped with ACTS. Attributes of the TSPS system organization, stored program control, peripheral circuits, operational programs and physical design are described in a publication of December, 1970 entitled "The Bell System Technical Journal" Volume 49, No. 10, pages 2417–2728. R. J. Jaegar, Jr. et al U.S. Pat. No. 3,484,560 issued Dec. 16, 1969 also discloses features of TSPS equipment and coin call processing. R. M. Dudonis U.S. Pat. No. 4,031,324, June 21, 1977 describes automated coin call processing equipment of the ACTS used in TSPS. It is to be understood that the present invention is not limited to use in No. 5 Crossbar or TSPS with ACTS configurations, but may be utilized with other types of call switching and service systems.

The invention described herein is embodied in a No. 5 type system and a TSPS with ACTS facility. It is particularly concerned with the coin station apparatus of FIG. 1 and the coin processor, FSK detector and translator, interrogate tone source, and connector arrangements which are represented by the blocks shown in heavy lines in FIG. 1. The other equipment units are neither shown nor described in detail herein except where necessary for a complete understanding of the invention.

DETAILED DESCRIPTION

Coin Station Memory and Control Circuits

Figure 1:
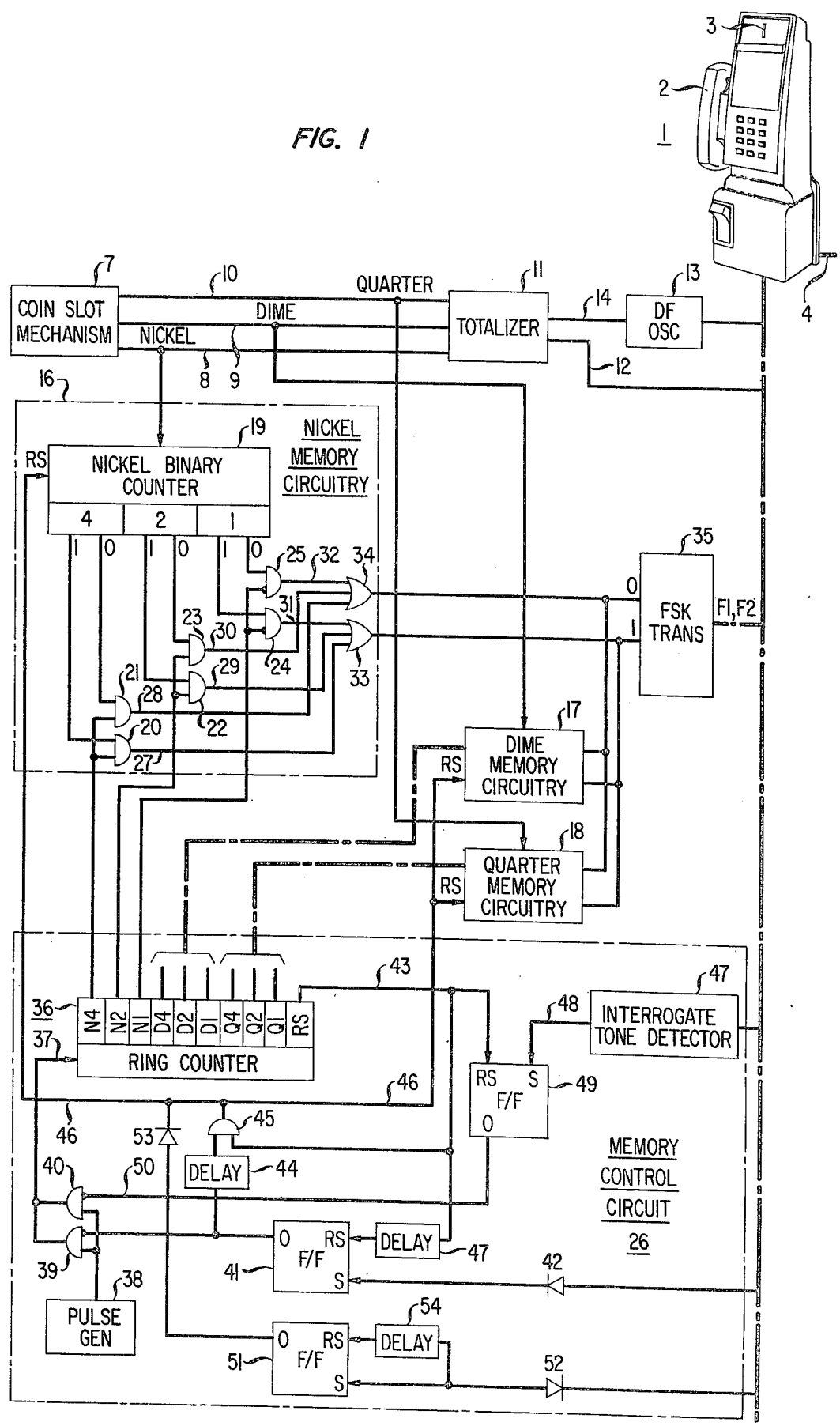

The general organization of the principal equipment units of my coin station will now be explained with reference to FIG. 1. It shows a coin box station set 1 having a conventional handset 2 and a single coin slot 3 connected over a telephone line 4 to a termination in a switching network 5 of a central switching system 6. Nickels, dimes and quarters deposited in slot 3 for call service actuate a conventional coin slot mechanism 7 to generator corresponding coin signals on leads 8, 9 and 10 which are then totalized on a totalizer 11. An output 12 of totalizer 11 in turn supplies a call origination signal to line 4 when an appropriate initial coin deposit has been made. Concurrently, totalizer 11 also activates a DF (dual frequency) oscillator 13 over a lead 14 for sending known combinations of tones over a station line 4 to switching office 6. These tones are thereafter selectively interpreted by equipment in office 6 or a TSPS center 15 for determining the adequacy of the deposit for the original call.

In accordance with my illustrative embodiment, station 1 is equipped with coin memory circuits 16, 17 and 18 for storing data on deposited nickels, dimes and quarters. The memory circuits for nickels, dimes and quarters are essentially the same. Therefore, only the schematic details of the nickel memory circuit 16 are disclosed in FIG. 1 while the dime and quarter circuits 17 and 18 are shown in block diagram form. Circuit 16 includes a nickel binary counter 19 having three stages 1, 2 and 4 for counting a maximum of seven deposited nickels. Counter 19 is stepped from stage-to-stage in response to nickel coin signals on lead 8 and thereby stores the total number of nickels actually deposited. Each of the stages 1, 2 and 4 has "0" and "1" outputs which are individually connected to a respective individual one of the inputs of "AND" gates 20–25. Each of the latter gates has another individual input which is connected to a memory control circuit 26 for controlled read-out of counter 19. Outputs 27–32 of gates 20–25 are extended through "OR" gates 33 and 34 to operate an FSK (frequency shift keying) transmitter 35 for sending FSK signals to representing nickel, dime and quarter data over line 4 to switching system 6.

Memory control circuit 26 is illustratively equipped with a ten-stage ring counter 36 having stages N4, N2, N1, D4, D2, D1, Q4, Q2 and Q1. These stages have outputs which are selectively utilized for sequentially enabling gates 20–25 to interrogate and readout stored coin deposit data from the nickel, dime and quarter binary counters and resultingly to FSK it over line 4 to switching system 6. Ring counter 36 also has a stage RS which is selectively used for concurrently resetting the nickel, dime and quarter counters of circuits 16, 17 and 18 as well as strategic flip-flops used for controlling the counter readouts on coin collect, interrogation, and coin return operations as later explained.

Counter 36 is selectively stepped from its initial or rest state of stage RS through stages N4, N2, N1, D4, D2, D1, Q4, Q2 and Q1 and thence again to its stage RS under control of pulses applied to its drive input 37 from a pulse generator 38 via either a coin collect "AND" gate 39 or an interrogate "AND" gate 40.

To effect a readout of the nickel, dime and quarter binary counters in memories 16, 17 and 18 each of the gates 20–25 is sequentially and partially enabled by the respective counter 36 stages N4, N2, N1, D4, D2, D1, Q4, Q2 and Q1. Each of the latter stages partially enables a pair of gates associated with respective "0" and "1" outputs of a binary counter stage. Illustratively, stage N4 of the counter 36 partially enables gates 20 and 21 associated with the respective "0" and "1" outputs of the nickel counter stage 4. Only one of the "0" and "1" outputs of the nickel counter stage 4 contains a signal voltage for fully enabling the associated gate 20 or 21 to pass a signal through gate 33 or 34 for activating the FSK transmitter 35. Gate 33 is effective for identifying a binary "1" stored in an interrogated counter stage. Similarly, gate 34 is associated with a binary "0" stored in an interrogated counter stage. Output signals from gates 33 and 34 are applied to respective "0" and "1" inputs of FSK transmitter 35 for sending signals of frequencies $F_1$ and $F_2$ respectively over line 4 to switching system 6. A sequential readout and FSK signaling of the binary data stored in each of the memories 16, 17 and 18 for seven nickels, dimes or quarters illustratively depositable in coin set 1 is in accordance with the following table:

| Number of Coins | | | |
|---|---|---|---|
| none  | 0 | 0 | 0 |
| one   | 0 | 0 | 1 |
| two   | 0 | 1 | 0 |
| three | 0 | 1 | 1 |
| four  | 1 | 0 | 0 |
| five  | 1 | 0 | 1 |
| six   | 1 | 1 | 0 |
| seven | 1 | 1 | 1 |

Binary "0" - FSK frequency $F_1$
Binary "1" - FSK frequency $F_2$

In accordance with the foregoing table, and to illustrate the presence of six nickels, dimes or quarters in memory 16, 17 or 18, a binary number 110 is stored in such memory and gate 33 is sequentially and successively enabled twice and the gate 33 is enabled to activate the FSK transmitter 35 for successively transmitting FSK frequencies $F_2F_2F_1$ over line 4 to indicate the stored coin data. To expand the example, assume that five nickels, zero dimes and two quarters are deposited in slot 3 and corresponding binary numbers are stored in the nickel, dime and quarter memories. As a result, station set 1 sends over line 4 under sequential control of the memory control circuit 26 the following sequence of FSK tones: $F_2F_1F_2 + F_1F_1F_1 + F_1F_2F_1$. This signal data is received, translated, processed and recorded in memory at switching system 6 as later described for determining the adequacy of the deposit for call service and the exact numbers of nickels, dimes and quarters in a coin box of set 1. It enables the telephone company to administer more accurately the scheduling of coin box collections and to monitor the integrity of personnel involved in such collections.

For coin collect operations, +130 volts is applied to line 4 at the switching system 6 for actuating electromechanical coin collect apparatus (not shown) of set 1 and thereby effecting collection of deposited coins in the conventional manner. According to my illustrative embodiment, the same +130 volt signal causing an operation of a coin collect flip-flop 41 for initiating a read-out of the memory circuits 16, 17 and 18 and the FSK signaling to the switching system 6 of signals representing the precise number of deposited nickels, dimes and quarters. The operation of flip-flop 41 is effected by extending the +130 volt signal from line 4 via diode 42 to a set input of flip-flop 41. In operating, a "0" output of flip-flop 41 enables gate 39 to apply pulses from generator 38 to input 37 for successively stepping ring counter 36 from stage RS through stages N4, N2, N1, D4, D2, D1, Q4, Q2 and Q1 and again to RS. As it does so, gates, such as gates 20–25, in circuits 16, 17 and 18 are sequentially enabled to pass the stored nickel, dime and quarter data signals from the respective binary counters, such as counter 19, to switching system 6 by means of FSK signaling under control of gates 33 and 34, FSK transmitter 35 and line 4. Upon the stepping of counter 36 again to stage RS, a reset signal is sent from the output of that stage over lead 43 first through delay 47 and then through the flip-flop 41 and delay circuit 44 enabled gate 45 and lead 46 to the reset inputs of the nickel, dime and quarter binary couters, such as counter 19, for effecting their resetting and an erasure of the stored coin information. After a suitable time delay to accomplish that resetting, the reset signal on lead 43 is extended through a delay circuit 47 to a reset input of flip-flop 41 for effecting its reset and a resulting disabling of gate 45. Delay circuit 44 is interposed between the "0" output of flip-flop 41 and an enable input of gate 45 so that the nickel, dime and quarter memory circuits 16, 17 and 18 are not reset when flip-flop 41 is initially switched to its SET state and counter 36 yet resets on its stage RS. Circuit 44 delays the full enabling of gate 45 until after counter 34 steps from stage RS to stage N4.

My illustrative structure also facilitates an interrogation and readout of the nickel, dime and quarter memories 16, 17 and 18 without any erasing of stored coin information as is done on coin collect and return jobs. Such an interrogation is made for checking the adequacy of coin deposits during initial and overtime periods and to prevent "red box" fraud calls. An interrogation is made by the structure of FIG. 1 in response to an application of an interrogate tone to the calling line 4 at the switching office end. The applied tone activates an interrogate tone detector 47 which, in turn, generates a signal on lead 48 to the set input of an interrogate flip-flop 49 for switching it to its set state. In doing so, a "0" output of flip-flop 49 enables the interrogate "AND" gate 40 over lead 50 to apply pulses from generator 38 to the drive input 37 of counter 36 and thereby step it from stage RS through stages N4, N2, N1, D4, D2, D1, Q4, Q2, Q1 and again to stage RS. A readout of the memory binary counters is thereby effected and the deposited coin information transmitted over line 4 toward the switching system 6 as priorly explained with respect to coin collect operations. Upon again stepping to stage RS, counter 36 applies a reset signal over lead 43 to a reset input of flip-flop 49 for immediately effecting its reset and, in turn, switching its "0" output to effect a disabling of gate 40 and thereby an inhibiting of further stepping of counter 36 beyond its RS stage. No resetting of the binary counters in circuits 16, 17 and 18 occurs due to the reset signal on lead 43 at this time because gate 45 is inhibited under control of the delay circuit 44 and the "0" output of flip-flop 41 being in its reset state.

Coin return operations are accomplished by the coin station set 1 in response to a conventional −130 volt coin return signal applied to line 4 from the switching office end. The return of deposited coins requires that the nickel, dime and quarter memory circuits 16, 17 and 18 be erased without any readout according to my exemplary embodiment. To do so, my illustrative structure includes a coin return flip-flop 51 which is responsive to the −130 volt signal applied to its set input via a diode 52 from line 4 for immediately generating a reset signal at its "0" output for extension via diode 53 and lead 46 to reset memory circuits 16, 17 and 18 and thereby erase store coin deposit information from those memories. After a delay sufficient to cause the erasure, flip-flop 51 is itself reset by an extension of the −130 volt signal from line 4 through diode 52 and delay circuit 54 to a reset input of flip-flop 51.

Figure 2:
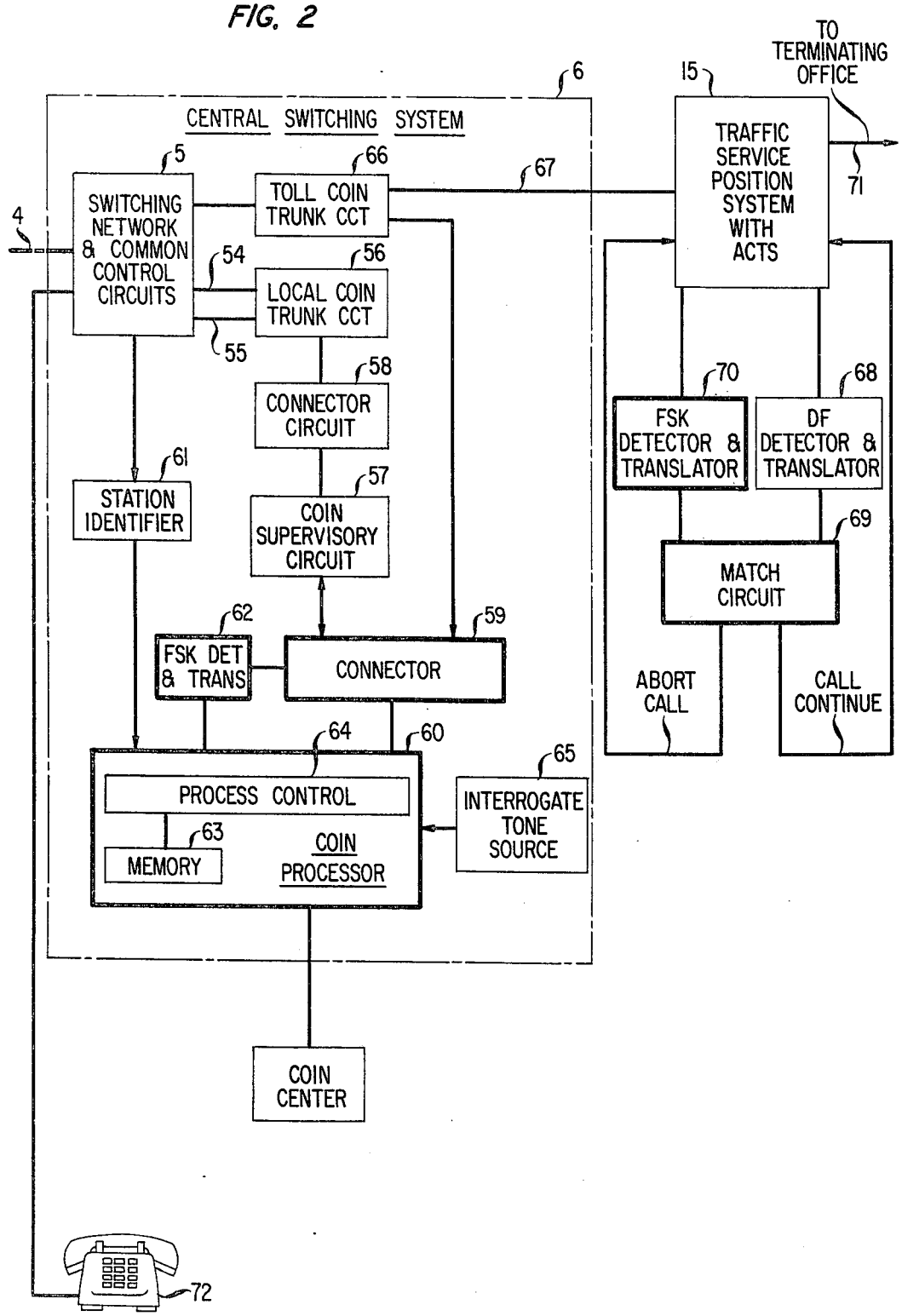

It is within the scope of my teaching to operate the structure of FIG. 1 at any time during the processing of coin calls whenever it is desired to determine the amount or adequacy of coin deposits to recycle the nickel, dime and quarter memory circuits 16, 17 and 18 incident to coin collect and return jobs. Illustratively, the interrogate tone, +130 volt coin collect signal or −130 volt coin return signal is selectively applicable to the station line 4 from the switching system and thereof during the pre-initial period, the initial period and one or more overtime periods of a local or toll coin call to perform the previously described operations of the FIG. 1 circuitry, including the readout and erasure of the memories 16, 17 and 18 and the transmittal of readout coin deposit information from those memories over line 4 toward the switching system 6. By way of example, the following description describes the procedures for applying the coin collect and interrogate tones to line 4 during initial and overtime periods of a local call served by switching system 6 and during pre-initial, initial and overtime periods of a toll call served by system 6 and the TSPS with ACTS of FIG. 2.

Local Coin Call

When a customer removes the handset 2 from its hookswitch and deposits the number of coins required for an initial period, the coin slot mechanism 7 activates the totalizer 11 to apply a start signal, such as a ground potential, on line 4 for initiating circuit actions in the switching system 6 that causes dial tone to be returned to the call in a manner as described in the aforementioned Busch patent. The caller then dials the called directory number and, in the conventional way, system 6 responds by establishing connections from line 4 through switching network 5 and terminations 54 and 55 of a local coin trunk circuit 56 to a called station 72. Ringing is then applied to station 72 for alerting the called party. After the ringing is answered, the call progresses into its initial period, such as a three minute period, the charge for which is covered by the coin deposit in set 1. Timing of the initial period is illustratively performed in a known manner by a timer (not shown) in the local coin trunk circuit 56.

Approximately ½ minute before the expiration of the initial (3 minute) period, the timer (not shown) in trunk circuit 56 initiates a request for access and connection to a coin supervisory circuit 57 via a connector circuit 58 in a conventional manner so that the initial deposit can be collected by applying +130 volts to the calling line. In accordance with my exemplary embodiment, supervisory circuit 57 following its connection to trunk circuit 56 bids through connector 59 for a connection of a coin processor 60 onto the call while temporarily deferring an application of the +130 volt coin collector potential to the connection toward line 4. Upon connection to the call, processor 60 obtains an automatic number identification of the calling coin station 1 by means of a station identifier 61 in a known manner. Thereafter, identifier 61 is released to serve other calls. At the same time, processor 60 attaches an FSK tone detector and translator 62 to the call connections for a subsequent sensing and translation of FSK signaled nickel, dime and quarter data from station set 1. Processor 60 next signals the supervisory circuit 57 to apply the +130 volt coin collect potential to line 4 via trunk circuit 56 and network 5.

As priorly described with respect to the circuitry of FIG. 1, whenever a coin collect function takes place, the nickel, dime and quarter memories 16, 17 and 18 of station set 1 are interrogated under control of memory control circuit 26 and the denominations of the coin data stored in those memories are FSK transmitted by the $F_1$ and $F_2$ tones over the call connections to detector and translator 62. The latter translates the received tones into nickel, dime and quarter coin counts which are then stored in locations of a memory 63 uniquely assigned to the calling station number identified by identifier 61 and under control of a process control circuit 64. Thereafter, processor 60, connectors 58 and 59, and circuits 57 and 62 are released for serving other calls. As already described, whenever the nickel, dime and quarter memories at station set 1 are interrogated in connection with a coin collect function, all data therein is erased so that overtime deposits can be counted and stored.

Before describing overtime call processing, it is advantageous to explain that my illustrative embodiment enables certain fraudulent local calls to be detected by the foregoing coin processor 60 control operations. One such fraud call is initiated without any coin deposit and by falsely simulating a ground potential start by totalizer 11 on lead 12. The absence of coin deposit, of course, results in no coin data being present in memories 16, 17 and 18. Processor 60 recognizes the absence of such coins by the translated FSK information it receives from translator 62 during the coin collect operation and causes a fraud entry to be made in a location in memory 63 associated with the number identity supplied to processor 60 by identifier 61.

Returning now to the processing of the coin call at the end of the initial period, the call timer (not shown) in trunk circuit 56 times-out and in a conventional manner again bids for connection to an idle coin supervisory circuit 57 through connector 58. In turn, circuit 57 again bids for connection to processor 60 via connector 59. Upon connection to the call, processor 60 causes an interrogate tone to be sent from interrogate tone source 65 via the connector 59, circuits 57, 58 and 56, termination 54, network 5 and line 4 for interrogating the nickel, dime and quarter memories 16, 17 and 18 are priorly described and thereby to check whether or not an overtime deposit has been made. If the FSK tones from station set 1 as translated and processed by processor 60 indicate a sufficient deposit, processor 60 signals the coin supervisory circuit 57 to activate trunk circuit 56 for allowing the call to continue for a prescribed overtime period. Circuits 57 through 65 are then released for serving other calls.

If either an insufficient or no overtime deposit has been made, processor 60 instructs the supervisory circuit 57 to bridge an announcement circuit (not shown) onto the call for supplying the caller with a conventional overtime announcement and request for deposit. After so instructing circuit 57, processor 60 and circuits 61-65 are released from the call. Approximately 30 seconds after the announcement, supervisory circuit 57 again engages processor 60 via connector 59 in order to make a final overtime deposit check by again sending an interrogate tone from source 65 to station 1 for interrogating memories 16, 17 and 18 as already described. If processor 60 determines from the translated FSK tones from circuit 62 that an appropriate overtime deposit has been made, it instructs supervisory circuit 57 to activate trunk circuit 56 for permitting the call to continue into an overtime period with the timing thereof being conducted in a known manner by a trunk timer (not shown). Circuits 57-65 are then released. If the required deposit has not been made, processor 60 instructs supervisory circuit 57 to terminate the call and release all circuits involved in the call connections.

In the present day telephone systems, overtime call processing is usually controlled with the assistance of an operator who monitors coin deposits by tones coupled to the talking circuit in a known manner. Based on interpretations of these tones, the operator thereafter either allows the call to continue or to be terminated. Telephone companies have been subjected to customer coupling of mechanisms to the handset transmitter for generating tones which simulate coin deposits. An advantage of the present invention is that an actual coin deposit must be made to continue the call into the overtime period. Customer-simulated tones cannot do so because they would not registered in the nickel, dime and quarter memories 16, 17 and 18 of station 1 and the processor 60 would immediately terminate the call as priorly explained.

One-half minute before the end and at the expiration of the first overtime period, the foregoing procedures described for the initial period including the coin collect and interrogate tone operations are repeated in connection with the termination or continuance of the call into another and subsequent overtime periods.

In accordance with my illustrative embodiment, the processor 60 is programmed automatically to allocate selectively variable overtime charges such at 10 cents during hours corresponding to peak traffic periods and 5 cents during nonpeak periods. As a consequence, processor 60 in effecting an interrogation of the station memories 16, 17 and 18 during peak and nonpeak periods is able to ascertain the selectively variable adequacy of the overtime deposit before allowing the call to continue.

Toll Coin Call

After the handset 2 of station set 1 is placed in its off-hook condition and dial tone is returned to the caller on either a dial tone first or initial coin deposit basis, the called number is transmitted over line 4 to switching system 6 in a conventional manner. Equipment in system 6 then processes the received called number and ascertains that the call requires toll processing by the TSPS facilities 15. System 6 thereupon establishes connections from station set 1 over line 4 through network 5 and a toll coin trunk circuit 66 to trunk 67 extending to TSPS 15. System 6 next forwards to TSPS 15 the call data including the calling and called numbers, which are needed for serving the call.

Thereafter, by virtue of TSPS with ACTS, system 15 automatically determines the appropriate toll call charge and provides an announcement to the calling customer requesting a corresponding coin deposit. As the coins are deposited, the coin slot mechanism 7 of FIG. 1 activates the totalizer 11 and DF (dual frequency) oscillator 13 via lead 8, 9, 10 and 14 for sending DF tones to TSPS 15 indicating the amount of the deposit. These tones are detected and translated by a DF detector and translator 68.

Occasionally, a customer unwarrantedly seeks to avoid depositing the required coins and obtain telephone service by using a "red box" device which is proximately coupled to the transmitter of handset 2 for simulating the DF tones. In accordance with my teaching, "red box" simulations are checked by interrogating the station memories 16, 17 and 18 after the DF tone translations and then comparing in a match circuit 69 DF tone translations by circuit 68 with FSK tone translations by an FSK detector and translator 70 of FIG. 2.

TSPS 15 effects the interrogation of memories 16, 17 and 18 without erasing their contents by signaling trunk 66 to seize processor 60 and momentarily engaging it to apply an interrogate tone from source 65 to line 4. As a consequence, the memories are interrogated and the readout coin information transmitted by FSK signaling as priorly described over line 4, network 5, trunk circuit 66, trunk 67 and TSPS 15 to the detector and translator 70. Thereupon, outputs of translators 68 and 70 are compared by match circuit 69. A match occurs only if the required coin deposits have actually been made and that information has been stored in the station memories and received by circuit 70. The latter is activated only in response to actual coin deposits. In that event, the match circuit 69 instructs TSPS 15 to continue the call and extend it in the conventional manner over trunk 71 to a terminating office. On the other hand, if a match does not occur, it indicates a "red box" simulation and circuit 69 signals TSPS to abort the call. When the call is aborted, trunk circuit 66 causes a coin return signal to be sent to line 4 for returning to the customer any coins which may have been deposited in set 1.

Timing for the initial and overtime periods and other toll call processing for station 1 including announcements and the like are accomplished conventionally by TSPS 15 with ACTS. During those periods, the coin collect, interrogate and return as well as coin denomination recording operations of the coin processor 60 and other circuitry of the central switching system 6 are essentially the same as already explained with respect to a local call except that they are performed under control of toll trunk circuit 66 instead of trunk circuit 56 and supervisory circuit 57.

While a specific embodiment of my invention has been described, it will be apparent to those skilled in the art that numerous modifications within the scope and spirit of the following claims are possible in light of my teaching.

What is claimed is:

1. A coin telephone station arrangement comprising plural stage memory means for registering signals indicating the number of nickels, dimes and quarters deposited in a coin telephone, memory control means responsive to a receipt of signals from a central office for sequentially examining each stage of said memory means to readout the registered signals indicating the numbers of nickels, dimes and quarters, and means responsive to said registered signals readout of said memory means for transmitting signals to said central office specifying the numbers of deposited nickels, dimes and quarters.

2. A coin telephone station arrangement in accordance with claim 1 wherein said plural stage memory means comprises a nickel register, dime register and a quarter register, each of which is responsive to a receipt of respective nickel, dime and quarter signals from a coin slot mechanism of said coin telephone for registering said signals.

3. A coin telephone station arrangement in accordance with claim 2 wherein each said nickel, dime and quarter register comprises a binary counter having a plurality of stages each of which comprises a "0" and a "1" output.

4. A coin telephone station arrangement in accordance with claim 3 wherein said plural stage memory means further comprises gate means connected to each said "0" and "1" output and being selectively enabled by said memory control means for sequentially examining each binary counter stage to readout the registered signals indicating the number of nickels, dimes and quarters and gating said last-mentioned signals to said transmitting means.

5. A coin telephone station arrangement in accordance with claim 4 wherein said transmitting means comprises means responsive to said signals gated by said gate means for sending tone signals to said central office indicating the numbers of deposited nickels, dimes and quarters.

6. A coin telephone station arrangement in accordance with claim 5 wherein said sending means comprises a frequency shift key signal transmitting means.

7. A coin telephone station arrangement in accordance with claim 1 wherein said memory control means comprises
  means operable for sequentially examining each stage of said memory means to readout the registered signals indicating the numbers of nickels, dimes and quarters, and
  means responsive to a receipt of an interrogate tone from said central office for operating said examining means.

8. A coin telephone station arrangement in accordance with claim 7 wherein said memory control means further comprises coin collect means responsive to a receipt of a coin collect signal from said central office for operating said examining means, and
  means activated by said coin collect means and said examining means for erasing said registered signals from said memory means.

9. A coin telephone station arrangement in accordance with claim 7 wherein said memory control means further comprises coin return means responsive to a receipt of a coin return signal from said central office for effecting an erasure of said registered signals from said memory means.

10. A coin telephone station arrangement in accordance with claim 1 wherein said memory control means comprises
  means operable for sequentially examining each stage of said memory means to readout the registered signals indicating the numbers of nickels, dimes and quarters,
  said examining means including a ring counter having a drive input and a plurality of output stages for sequentially controlling an examination of each stage of said memory means,
  a pulse generator for supplying ring counter drive pulses, and
  gating means responsive to a receipt of control signals for applying said pulses from said pulse generator to said drive input for advancing said ring counter from stage-to-stage and thereby effecting a sequential examination of said memory means stages.

11. A coin telephone station arrangement in accordance with claim 10 wherein said memory control means further comprises
  interrogate means responsive to a receipt of an interrogate tone from said central office for sending an enabling control signal to said gating means for applying said pulses to said drive input,
  and said interrogate means including
  an interrogate flip-flop having set input and an output,
  means for detecting a receipt of said interrogate tone from said central office and activating said set input to switch said flip-flop to its set state and thereby apply said enabling control signal from its output to said gating means.

12. A coin telephone station arrangement in accordance with claim 11 wherein
  said interrogate flip-flop further includes a reset input,
  one of said ring counter output stages comprises a reset output stage responsive to an advance of said ring counter to said reset output stage for applying a reset pulse to said reset input for switching said interrogate flip-flop to its reset state and thereby withdrawing enabling control signal from said gating means.

13. A coin telephone station arrangement in accordance with claim 10 wherein said memory control means further comprises
  coin collect means responsive to a receipt of a coin collect signals from said central office for sending an enabling control signal to said gating means for applying said pulses to said drive input for advancing said ring counter from stage-to-stage,
  and said coin collect means including
  a flip-flop having an output and a set input responsive to a receipt of a coin collect signal from said central office for switching said flip-flop output to its set state and thereby applying said enabling control signal from said last-mentioned output to said gating means.

14. A coin telephone station arrangement in accordance with claim 13 wherein
  one of said ring counter output stages comprises a reset output stage,
  said coin collect flip-flop further includes a reset input, and
  further comprising reset means controlled by said reset output stage and said flip-flop output enabling signals for erasing said registered signals from said memory means.

15. A coin telephone station arrangement in accordance with claim 14 wherein said reset means comprises
  a logic gate having plural inputs and a single output,
  delay means connected to one of said plural inputs and to said flip-flop output for delaying an application of said flip-flop output enabling control signal to said one of said plural inputs, and
  a second one of said plural inputs connected to said reset output stage for activating said logic gate to effect an erasure of said registered signals from said memory means.

16. A coin telephone station arrangement in accordance with claim 15 wherein said reset means further comprises a reset delay means connected between flip-flop reset input and said reset output stage of said ring counter for effecting a resetting of said flip-flop upon said ring counter advance to said reset output stage.

17. A coin telephone station arrangement in accordance with claim 1 wherein said memory control means further comprises
  coin return means responsive to a receipt of a coin return signal from said central office for controlling said memory means to erase said registered signals therefrom.

18. A coin telephone station arrangement in accordance with claim 17 wherein said coin return means comprises a flip-flop having an output and a set input responsive to a receipt of said coin return signal for generating an erasure control signal at said last-mentioned output to effect said erasure of registered signals in said memory means, said flip-flop further comprising a reset input and delay means responsive to said coin return signal for applying a reset signal to said reset input after said erasure of registered signals in said memory means.

19. In combination, coin telephone station comprising plural stage memory means for registering signals indicating the number of nickels, dimes and quarters deposited in a coin telephone, memory control means responsive to a receipt of signals from a central office for sequentially examining each stage of said memory means to readout the registered signals indicating the numbers of nickels, dimes and quarters, and means responsive to said registered signals readout of said memory means for transmitting signals to said central office specifying the numbers of deposited nickels, dimes and quarters, and a central office coin processor including a coin memory for storing nickel, dime and quarter data for said coin station and a process control means for controlling a transmission of said control signals to said memory control means and being responsive to a receipt of signals specifying said numbers of deposited nickels, dimes and quarters for controlling a storage of the specified numbers in said coin memory.

20. The combination in accordance with claim 19 wherein said central office further comprises a coin trunk circuit, a coin supervisory circuit activated by said trunk circuit for engaging said coin processor on a coin call from said station, means operable for deriving the identity of said station, means operable for sending said control signals to said memory control means, means connectable to said call for detecting and translating the transmitted signals specifying the numbers of deposited nickels, dime and quarters, and said process control means being responsive to said engaging of said coin processor on said call for operating said deriving means and said sending means and for connecting said detecting and translating means to said call and thereafter controlling a storage of the derived station identity and translated number signals in said coin memory.

21. The combination in accordance with claim 20 wherein said means for sending said control signals to said memory control means comprises means operable for sending direct current coin collect and return signals to said memory control means and means operable for sending an interrogate tone to said memory control means, and said process control means being effective during said call for selectively operating said coin collect and return signal sending and interrogate tone sending means to effect a sequential readout of said memory means.

22. The combination in accordance with claim 19 further comprising means responsive to a receipt of dual frequency tones from said station for translating said signals into first signal indications of a number of deposited nickels, dimes and quarters, means responsive to a receipt of said signals from said station specifying the number of deposited nickels, dimes and quarters for translating said last-mentioned signals into second signal indications of the actual number deposited, and means for comparing said first and second signal indications to terminate said call upon a failure to match and to continue said call upon a match of said compared signal.

23. A coin telephone system comprising a coin station having means for registering signals indicating the numbers of nickels, dimes and quarters deposited in said coin station, readout means operable for reading out the registered signals from said registering means, and a coin processor including a coin memory for storing data pertaining to the numbers of nickels, dimes and quarters deposited in said station for each call therefrom, a process control means responsive during an initial period of a call from said station for operating said readout means and being responsive to said reading out of said registering means for controlling a storage in said coin memory of the numbers of deposited nickels, dimes and quarters for said station.

24. A coin telephone system in accordance with claim 23 wherein said readout means is operative following said readout of said registered signals for resetting said registering means to erase the registered signals therefrom, said process control means is responsive to an expiration of said initial period of said call for operating said readout means for reading out registered signals in said registering means for nickel, dime and quarter deposits for an overtime period, and said process control means being further responsive to said last-mentioned reading out for controlling a storage in said coin memory of the numbers of nickels, dimes and quarters deposited in said station for said overtime period.

25. A coin telephone system in accordance with claim 24 further comprising means responsive to first signals from said station for indicating the numbers of nickels, dimes and quarters deposited in said station, means responsive to said reading out for generating second signals from said station specifying the actual number of nickels, dimes and quarters deposited in said station, and a match circuit controlled by said indicating and specifying means for continuing said call when the indicated numbers match said specified numbers and terminating said calls when the indicated numbers fail to match said specified numbers.

26. A telephone coin station circuit comprising plural stage memory means for registering signals indicating the number of nickels, dimes and quarters, deposited in a coin telephone, means operable for sequentially examining each stage of said memory means to readout the registered signals indicating the numbers of nickels, dimes and quarters, means responsive to a receipt of an interrogate signal from a central office for operating said examining means, coin collect means responsive to a receipt of a coin collect signal from a central office for operating said examining means, means responsive to said registered signals readout of said memory means for sending signals to said central office specifying the numbers of deposited nickels, dimes and quarters, and means activated by said coin collect means and said examining means for erasing said registered signals from said memory.

27. A coin telephone station arrangement comprising individual memory means for respectively storing signals representing the numbers of different value coins deposited in the coin telephone station and means for sequentially interrogating said memory means responsive to signals from a central office and for transmitting to the office indications of the stored signals in said memory means.

28. A coin telephone station arrangement in accordance with claim 27 further comprising a coin totalizer, and first signaling means for transmitting signals responsive to the output of said totalizer to the central office and indicating the value of coin deposits to the coin telephone station, and wherein said interrogating and transmitting means includes second signaling means, said first and second signaling means utilizing distinct signaling modes.

29. A coin telephone station in accordance with claim 28 wherein said first signaling means comprises means for providing dual frequency signaling and second signaling means comprises means for providing frequency shift key signaling.

30. A coin telephone station for preventing fraudulent telephone calls by simulation of coin detection signals comprising first means for transmitting to a central office in a first signaling mode first signals representative of coin deposits at the coin telephone station and second means for transmitting to the central office in a different signaling mode second signals representative of coin deposits at the coin telephone station.

31. A coin telephone station in accordance with claim 30 wherein said first means includes a totalizer and dual frequency signaling means for transmitting to the central office the first signals representative of the output of said totalizer and where said second means includes memory means for storing the number of each different valued coin deposited at the coin telephone station and frequency shift key signaling means for transmitting to the central office the second signals representative of the number of each different valued coin deposited at the coin telephone station.

* * * * *

UNITED STATES PATENT AND TRADEMARK OFFICE
CERTIFICATE OF CORRECTION

PATENT NO. : 4,124,774
DATED : November 7, 1978
INVENTOR(S) : Alfred Zarouni

It is certified that error appears in the above-identified patent and that said Letters Patent are hereby corrected as shown below:

Column 2, line 36, "emodiment" should read --embodiment--. Column 2, line 64, "the" should read --The--. Column 6, line 34, "to" should be deleted. Column 8, line 4, "couters" should read --counters--. Column 9, line 2, after "deposits" insert --or--. Column 10, line 40, "are" should read --as--. Column 11, line 3, after "in" delete "the". Column 11, line 15, after "not" insert --be--. Column 11, line 27, "at" should read --as--. Column 14, line 21, "signals" should read --signal--. Column 16, line 13, "signal" should read --signals--.

Signed and Sealed this

Twenty-second Day of May 1979

[SEAL]

Attest:

RUTH C. MASON
Attesting Officer

DONALD W. BANNER
Commissioner of Patents and Trademark